(12) United States Patent
Renshaw

(10) Patent No.: US 6,892,994 B1
(45) Date of Patent: May 17, 2005

(54) THREE-FINGERED HOLDER

(76) Inventor: Mary Renshaw, 27 Rancho Rd., Tustin, CA (US) 92780

( * ) Notice: Subject to any disclaimer, the term of this patent is extended or adjusted under 35 U.S.C. 154(b) by 8 days.

(21) Appl. No.: 10/457,764

(22) Filed: Jun. 9, 2003

(51) Int. Cl.⁷ ............................................. A47B 91/00
(52) U.S. Cl. .............. 248/346.04; 248/310; 248/316.5; 248/154
(58) Field of Search ...................... 248/346.04, 346.03, 248/346.06, 310, 316.5, 146, 149, 154, 311.2; 269/59, 63, 70, 76, 89, 156, 159, 290

(56) References Cited

U.S. PATENT DOCUMENTS

| | | | |
|---|---|---|---|
| 148,113 A * | 3/1874 | Ffield et al. ...................... 81/4 |
| 351,871 A * | 11/1886 | Lampert ............................ 81/6 |
| 453,571 A * | 6/1891 | Babbitt .......................... 211/14 |
| 529,953 A * | 11/1894 | Presnell ....................... 248/310 |
| 1,161,762 A * | 11/1915 | Bartlett ......................... 248/310 |
| 1,174,700 A * | 3/1916 | Eastman ...................... 362/485 |
| 1,301,011 A * | 4/1919 | Kohn ........................... 337/398 |
| 1,720,115 A | 7/1929 | Barnes |
| 2,379,060 A * | 6/1945 | Bacheldor .................... 248/113 |
| 2,497,194 A * | 2/1950 | White ........................... 248/500 |
| 2,579,878 A * | 12/1951 | Stone ........................... 248/313 |
| 2,615,667 A * | 10/1952 | Merton et al. ................ 224/324 |
| 2,921,785 A * | 1/1960 | Underhill ..................... 269/218 |
| 3,559,935 A | 2/1971 | Gardner ....................... 248/125 |
| 3,848,564 A | 11/1974 | Kull .............................. 118/13 |
| 4,222,577 A * | 9/1980 | Giffin ........................... 279/114 |
| 5,154,380 A * | 10/1992 | Risca ........................... 248/154 |
| 5,398,898 A * | 3/1995 | Bever .......................... 248/154 |
| 2003/0062458 A1 * | 4/2003 | Leopold et al. ............. 248/310 |
| 2004/0099782 A1 * | 5/2004 | Schulz .................. 248/346.06 |

FOREIGN PATENT DOCUMENTS

GB  2092506 A  *  8/1982

* cited by examiner

Primary Examiner—Anita King
Assistant Examiner—Naschica S. Morrison
(74) Attorney, Agent, or Firm—Goldstein Law Offices, P.C.

(57) ABSTRACT

A three-fingered holder having the ability to selectively and firmly grasp a variety of different objects. The holder comprises a housing, three fingers partially sheathed within and partially extending from the housing, and a spring-biased clamping mechanism contained within the housing. The mechanism has an open position wherein the fingertips of the fingers are substantially separated, but is biased toward a closed position wherein the fingertips are positioned in proximity to one another, in order to firmly grasp an object therebetween. The mechanism is converted to the open position by pressing down upon a lever. Release of the lever allows the spring-biased mechanism to return toward the closed position and to thereby urge the fingers towards one another. The fingertips each terminate in a soft rubber contact plate, which prevents even delicate objects from becoming damaged while being held by the holder.

11 Claims, 5 Drawing Sheets

_US 6,892,994 B1_

THREE-FINGERED HOLDER

BACKGROUND OF THE INVENTION

1. Field of the Invention

The invention relates to a holder, and in particular it relates to a three-fingered holder having the ability to firmly grasp a variety of different objects.

2. Description of the Related Art

There are a great many occasions in which it is necessary or useful for a user to immobilize a variety of different objects. In particular, it may be necessary for the user to firmly immobilize an object prior to performing detailed work upon the object. Often, the user will attempt to immobilize the object with one hand while attempting to manipulate the object with the other hand. This obviously may limit the extent to which the user may easily manipulate the object. In addition, excessive handling of a delicate object can easily lead to damage to that object. Accordingly, there is a need for a holder capable of selectively immobilizing a variety of different objects, in order that the user may use both hands to manipulate the object.

A variety of holders are available for selectively holding different items. For example, U.S. Pat. No. 3,559,935 to Gardner appears to show a holder for an object of art, comprising a stand with an adjustable pair of cupped holder assemblies. Additionally, U.S. Pat. No. 1,720,115 to Barnes appears to show a fruit holder comprised of a series of spring biased arms. Furthermore, U.S. Pat. No. 3,848,564 to Kull appears to show a holder for grasping and rotating an egg during coloring.

None of these devices appears to show a holder having three fingers, wherein two of the fingers are opposable fingers, said holder also having a mechanism for selectively bringing the fingers together in order that they may firmly grasp and thereby immobilize a variety of different objects. While these devices may be suitable for the particular purpose employed, or for general use, they would not be as suitable for the purposes of the present invention as disclosed hereafter.

SUMMARY OF THE INVENTION

It is an object of the invention to provide a holder capable of selectively immobilizing a variety of different objects. Accordingly, the holder has three fingers and a clamping mechanism capable of selectively moving the fingers closer to one another, thereby providing a holder capable of selectively immobilizing a variety of different objects.

It is another object of the invention to provide a holder wherein the fingers are ideally situated for firmly grasping an object. Accordingly, the holder has a housing having three fingers extending partially therefrom. Two of the fingers are located at diametrically opposed positions upon the housing, and the third finger is located between the opposable fingers, thereby providing a holder wherein the fingers are ideally situated for firmly grasping an object.

It is an additional object of the invention to provide a holder which will not damage fragile objects held within the fingers. Accordingly, each of the fingers terminates in a fingertip having a soft rubber contact plate, thereby preventing even delicate objects from becoming damaged while being grasped within the fingers.

It is a further object of the invention to provide a holder which immobilizes an object in order that a handicapped person with limited use of one or both hands may be capable of manipulating the object. Accordingly, the holder permits an individual with limited use of the hands to easily immobilize a variety of objects for subsequent manipulation.

The invention is a three-fingered holder having the ability to selectively and firmly grasp a variety of different objects. The holder comprises a housing, three fingers partially sheathed within and partially extending from the housing, and a spring-biased clamping mechanism contained within the housing. The mechanism has an open position wherein the fingertips of the fingers are substantially separated, but is biased toward a closed position wherein the fingertips are positioned in proximity to one another, in order to firmly grasp an object therebetween. The mechanism is converted to the open position by pressing down upon a lever. Release of the lever allows the spring-biased mechanism to return toward the closed position and to thereby urge the fingers towards one another. The fingertips each terminate in a soft rubber contact plate, which prevents even delicate objects from becoming damaged while being held by the holder.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
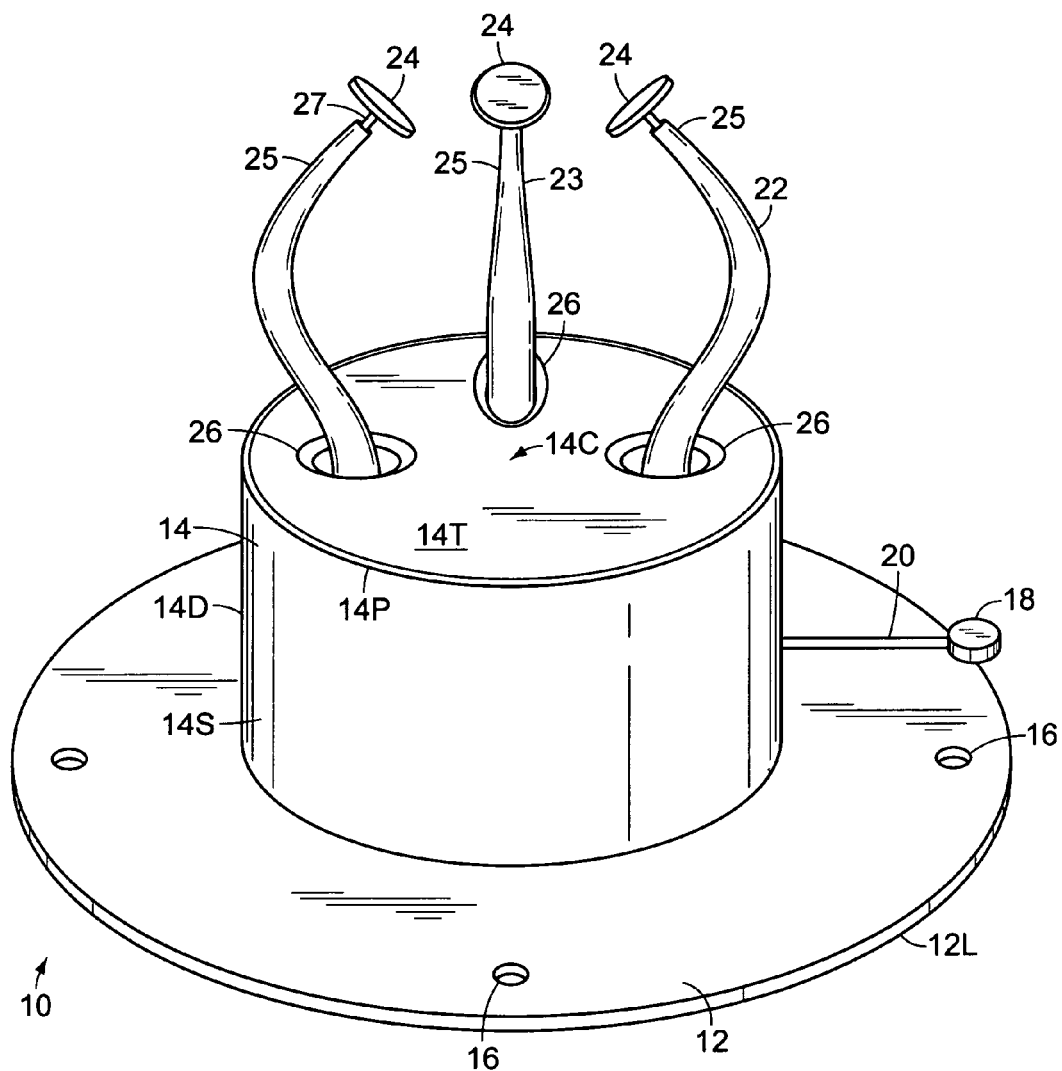
FIG. 1 is a perspective view of a three-fingered holder.

FIG. 1 illustrates a holder 10, suitable for selectively grasping and immobilizing a variety of objects, having a substantially cylindrical housing 14, and having two opposable fingers 22 and a central finger 23. Each of the fingers 22, 23 terminates in a fingertip 25. The housing 14 has an interior 14I which partially sheathes the fingers 22, 23. A substantial portion of each of the fingers 22, 23 extends through the housing 14 prior to their termination in the fingertips 25.

The housing 14 has a cylindrical body 14D having a curved side 14S, a base 12 and a top 14T. The top 14T has a peripheral edge 14P, a center 14C, and three sockets 26 extending fully therethrough. The sockets 26 are arranged around the center 14C and in proximity to the peripheral edge 14P. The fingers 22, 23 extend through the sockets 26. The housing 14 encloses a spring-loaded clamping mechanism 40 capable of selectively moving the fingers 22, 23 towards one another, in order that an object may be held within the fingers 22,23 and immobilized, as will be described.

Two of the sockets 26 extend through the top 14T of the housing 14 at positions which are diametrically opposed to one another. The opposable fingers 22 partially extend through these diametrically opposite sockets 26, thereby enabling the holder 10 to firmly grasp an object in a manner analogous to the way in which an object is held between an opposable thumb and another finger of a human hand. The central finger 23 extends through a socket 26 in proximity to the peripheral edge 14P at a position which is between the sockets 26 from which the two opposable fingers 22 extend, but is located at substantially the same radial distance from the center 14C as the opposable fingers 22.

The fingers 22, 23 taper towards the fingertips 25, in order to be able to more precisely engage the object which is being held between them. Each of the fingertips 25 terminates in a substantially cylindrical rod 27 having threads around its periphery. Each of the fingertips 25 has a contact plate 24 selectively attached to said cylindrical rods 27. In particular, each contact plate 24 has a centrally located internal bore having threads which match those of the rods 27, thereby enabling the contact plates 24 to be selectively attached to the fingertips 25 by threading the threads of the rods 27 into the corresponding threads lining the internal bore of the contact plates 24. The contact plates 24 are constructed from flexible, soft rubber so that the objects which are grasped by the fingers 22, 23 are not damaged while being grasped.

The base 12 of the housing 14 extends outwardly from the cylindrical body 14D, for imparting enhanced stability to the holder 10 and for making it less likely that the holder 10 will inadvertently tip over. The base 12 has a lower surface 12L having a resilient rubber coating, thereby making it unlikely that the holder 10 will inadvertently slip upon a support surface upon which the holder 10 has been situated. The base 12 has a plurality of circular openings 16 extending fully therethrough, so that the base 12 may be selectively anchored to the support surface by inserting a screw through each of the circular openings 16, and by threading said screws into the support surface.

Figure 2:
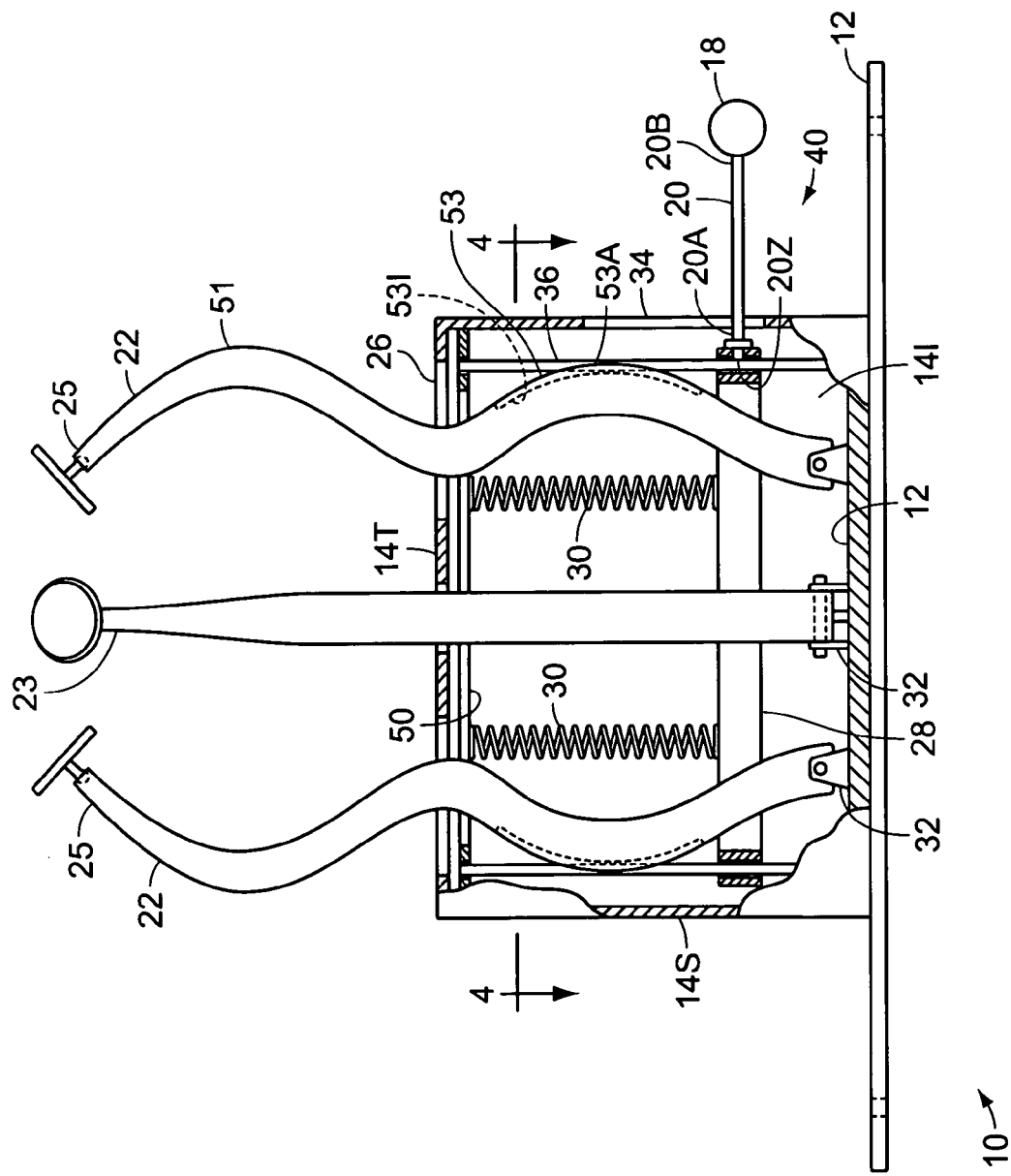
FIG. 2 is a side view of the holder, with portions of the housing broken away to illustrate internal details of a clamping mechanism, wherein the mechanism is in an open position.

FIG. 2 illustrates the clamping mechanism 40 in mechanical contact with each of the fingers 22, 23, for selectively bringing the fingertips 25 together in order to firmly grasp an object between the fingertips 25. The mechanism 40 has an open position wherein the fingertips 25 are substantially separated from one another, and is biased toward a closed position wherein the fingertips 25 are positioned in proximity to one another. The mechanism 40 is capable of a plurality of partially closed positions wherein the fingertips 25 have been partially moved towards one another but are separated by an object located between the fingers 22, 23, such that the fingers 22, 23 are then biased against said object. In FIG. 2, the mechanism 40 is in the open position.

The mechanism 40 comprises a selectively vertically movable circular yoke 28 contained within the housing 14 and a horizontal thumb lever 20 in mechanical contact with said yoke 28. The holder 10 has an upper plate 50 located within the housing 14 below the top 14T. The mechanism 40 further comprises two coiled springs 30 extending between the yoke 28 and the upper plate 50, and four guide rods 36, extending between the base 12 and the upper plate 50. The yoke 28 is slidably mounted upon the four rods 36. The thumb lever 20 has a first end 20A located within the housing 14, and a second end 20B which is external to the housing 14. The first end 20A terminates in a contact point 20Z which may be selectively tightened against one of the vertical rods 36 in order to immobilize the clamping mechanism 40 at a particular position. The second end 20B terminates in a rotatable thumbscrew 18 used for selectively tightening the contact point 20Z of the lever 20 against one of the rods 36. Accordingly, a threaded portion is preferably located on the lever 20 just adjacent to the contact point 20Z for engaging internally threaded portions of the yoke 28 adjacent to said rod 36. In FIG. 2, the lever 20 has been threaded into the yoke 28 and the point 20Z has been tightened against one of the vertical rods 36 to hold the yoke 28 in position. The side 14S of the housing 14 has a vertical lever slot 34 extending fully therethrough. The second end 20B of the lever 20 extends outwardly from the housing 14 through the vertical lever slot 34. When a user slides the lever 20 vertically downward within the slot 34, this causes the yoke 28 to move vertically downward and thereby allows the fingers 22, 23 to move apart, as will be described.

Figure 4:
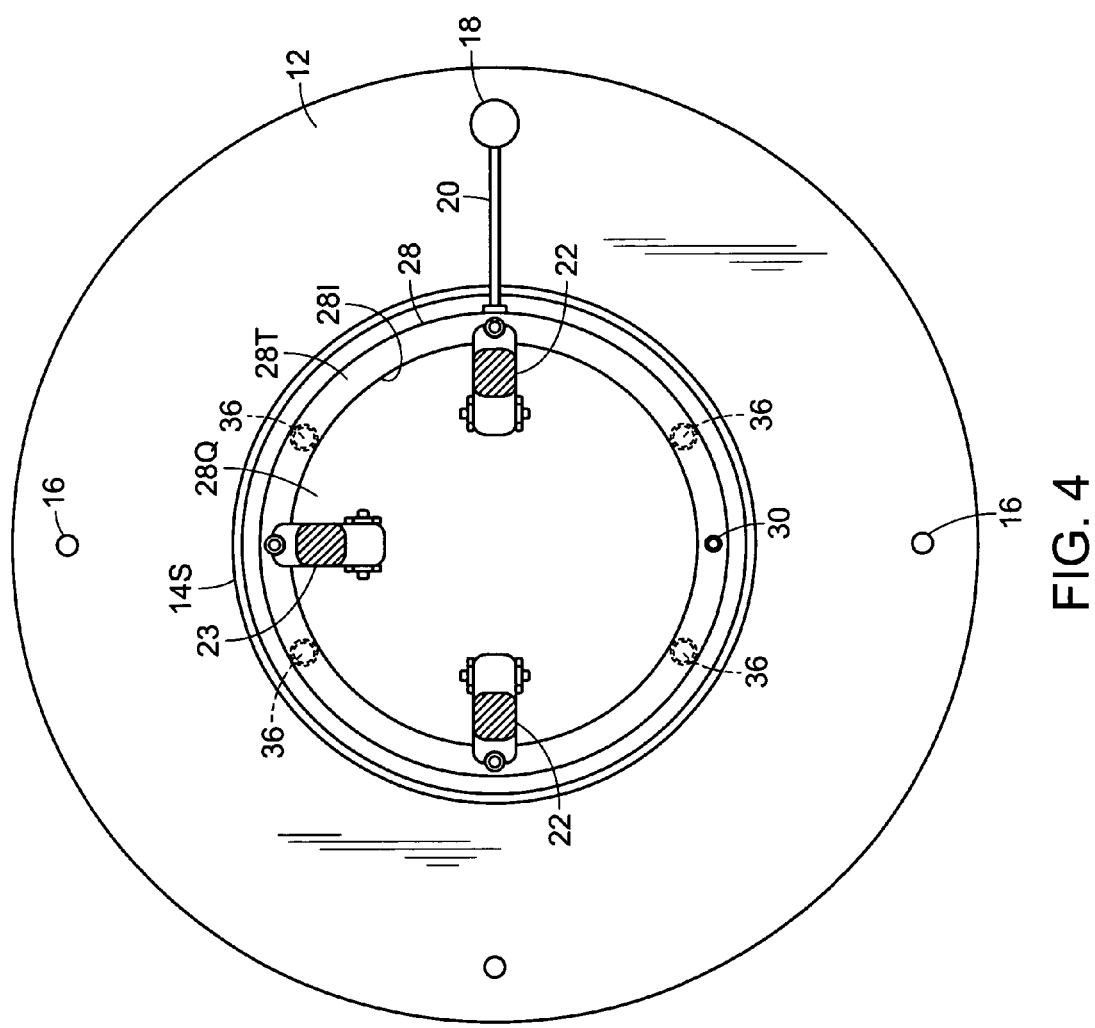
FIG. 4 is a cross-sectional view taken along line 4—4 of FIG. 2, further illustrating the clamping mechanism.

Turning momentarily to FIG. 4, the circular yoke 28 forms a ring having a central opening 28Q, a top surface 28T, and an inner surface 28I. The yoke 28 is slidably mounted on the four vertical rods 36. The yoke 28 is biased upward by the springs 30 which extend between the top surface 28T of the yoke 28 and the housing upper plate 50.

Returning to FIG. 2, the fingers 22, 23 are mounted to the base 12 with pivot brackets 32. The fingers 22, 23 are all mounted within the circular yoke 28. The pivot brackets 32 allow the fingers 22, 23 to pivot radially outward from the center 14C of the housing 14. The fingers 22, 23 each have a double convex curve, having an upper curve 51 and a lower curve 53. The upper curve 51 orients the contact plates 24 inward. The lower curve 53 acts as a 'camming surface' so that the angular positions of the fingers 22, 23 are determined by the vertical position of the yoke 28. The lower curve 53 has an outermost point 53A, and has a rod indentation 53I for allowing the rod 36 to extend partially therein. When the clamping mechanism 40 is in the open position, the yoke 28 is lowered, and the fingers 22,23 are allowed to spread apart.

Figure 3:
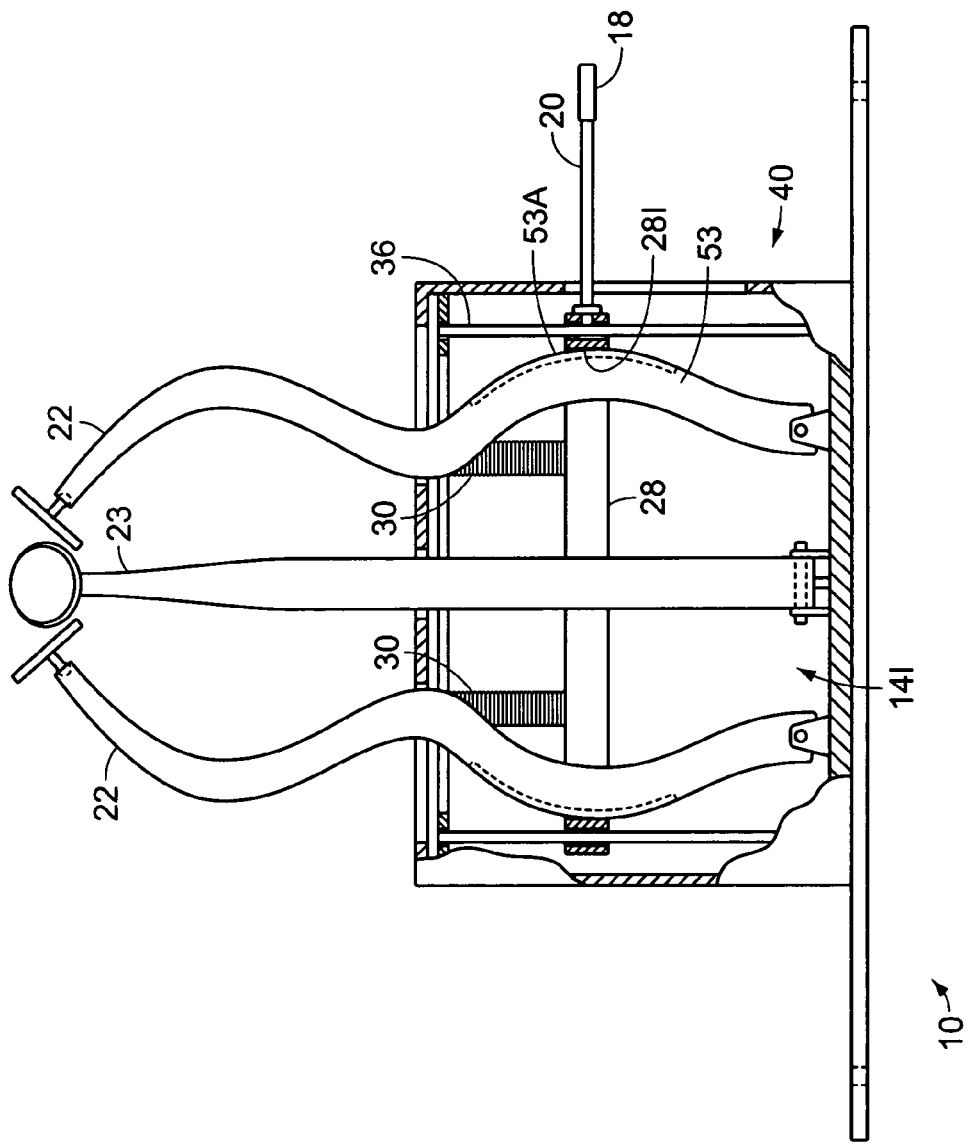
FIG. 3 is a side view of the holder, as in FIG. 2, except wherein the clamping mechanism is in a closed position.

In FIG. 3, the lever 20 has been released by the user, thereby allowing the mechanism 40 to return to the closed position. Here, the yoke 28 is in its uppermost position, and the inner surface 28I of the yoke 28 has contacted the outermost point 53A of the lower curve 53 and urged the contact plates 24 furthest inward. The springs 30 have biased the yoke 28 upward to this position. Since the springs 30 bias the yoke 28 upward, they bias the plates 24 against an object placed therebetween.

Figure 5:
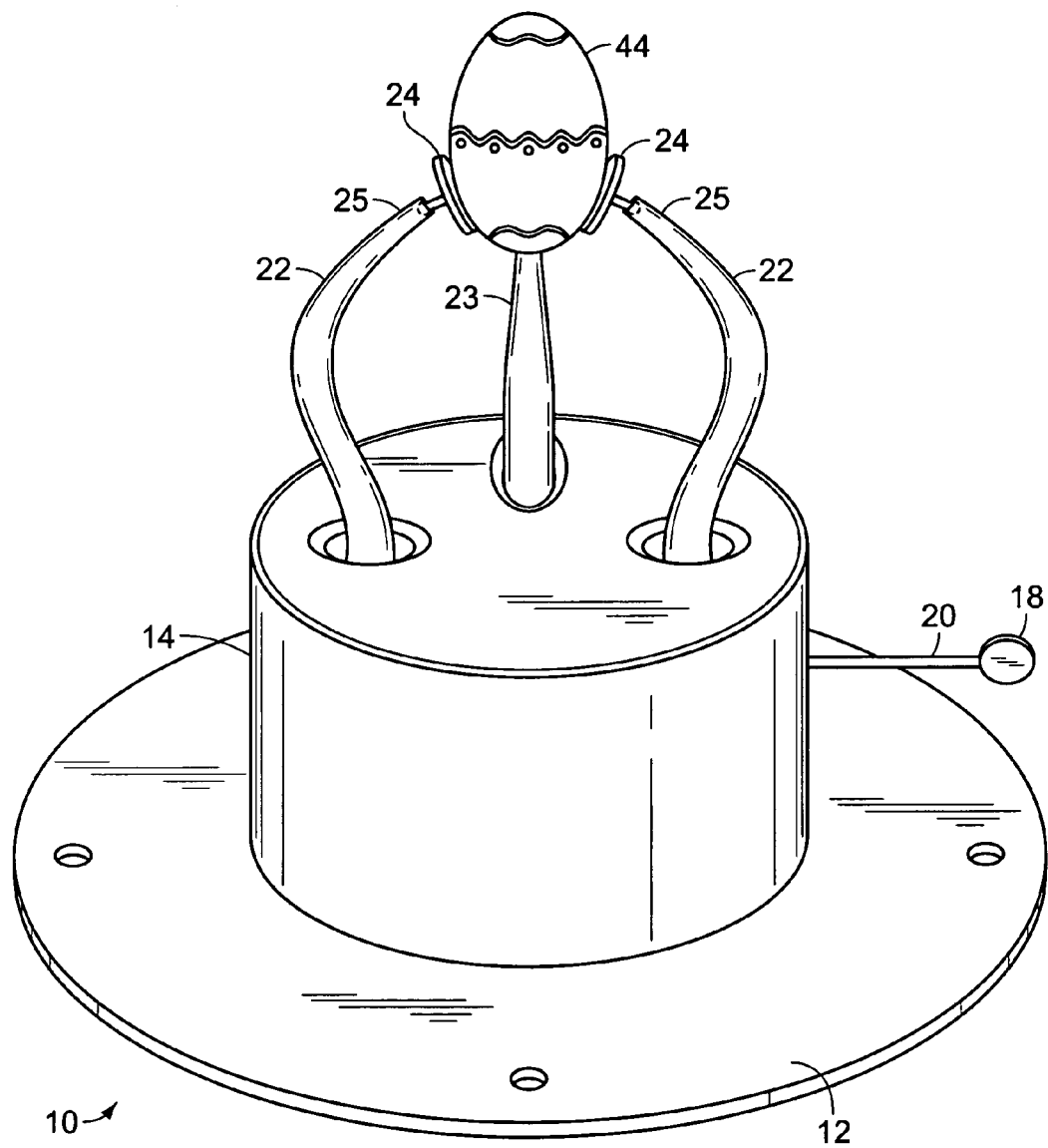
FIG. 5 is a perspective view of the holder in a partially closed position, wherein the fingers are firmly grasping an object.

In FIG. 5, the clamping mechanism 40 is in one of the partially closed positions, and the fingers 22, 23 are firmly grasping an egg 44. The egg 44 is bracketed by the soft rubber contact plates 24, which prevent even fragile objects such as the egg 44 from becoming damaged while being grasped by the holder 10.

In use, a user spreads the fingers 22, 23 apart by sliding the lever 20 vertically downward within the lever slot 34. The user positions an object which is to be immobilized by the holder 10 between the fingertips 25. The user then releases the lever 20, thereby allowing the springs 30 to bias the yoke 28 vertically upward and to push the fingertips 25 towards one another. The thumbscrew 18 is then rotated in order to tighten the thumb lever 20 against one of the guide rods 36, and to thereby immobilize the clamping mechanism 40 at that particular position. The use of three fingers allows the object to be held firmly while still allowing the object to be viewed or worked upon. When the holder 10 is no longer needed to hold the object, the thumbscrew 18 is rotated in an opposite direction, thereby freeing the lever anchoring rod 36 from the thumb lever 20. Now, the lever 20 may be vertically lowered, thereby allowing the fingertips 25 to once again separate, thereby releasing the grasp of the holder 10 upon the object. The object may now be safely removed from the holder 10.

In conclusion, herein is presented a three-fingered holder, capable of selectively holding a variety of different objects. The invention is illustrated by example in the drawing figures, and throughout the written description. It should be understood that numerous variations are possible, while adhering to the inventive concept. Such variations are contemplated as being a part of the present invention.

What is claimed is:

1. A holder for selectively grasping and immobilizing an object, comprising:

a housing having a base, a side, an interior, and a top having a peripheral edge and a center, said top having at least two sockets extending fully therethrough outward of the center;

at least two selectively movable opposable fingers each having a fingertip, each of said fingers partially extending through one of the at least two sockets with the fingertip above the top of the housing, each of said fingers partially sheathed within the interior of the housing and mounted to the base by pivot brackets for allowing the fingers to pivot radially toward and away from the center;

an additional socket;

a central finger having a fingertip, wherein the central finger is partially sheathed within the housing, and partially extends through said additional socket, said central finger for allowing the holder to more firmly grasp an object, said central finger extending through said socket in proximity to the peripheral edge of the top of the housing at a position which is between the sockets from which the two opposable fingers extend, but is at substantially the same radial distance from the center; and a clamping mechanism substantially contained within the housing, for selectively bringing the fingertips together in order to firmly grasp an object between the fingertips, said mechanism in mechanical contact with said fingers, said mechanism biased toward a closed position wherein the fingertips are positioned in proximity to one another, said mechanism also having an open position wherein the fingertips are substantially separated from one another, and having a plurality of partially closed positions wherein the fingertips have been partially moved towards one another, in order that the holder may be used to immobilize objects having a variety of sizes, wherein the clamping mechanism has a selectively vertically movable circular yoke having a central opening and a top surface, said yoke contained within the housing, wherein the fingers are mounted to the base within the circular yoke, said mechanism further comprising a horizontal thumb lever in mechanical contact with said yoke and capable of selectively vertically moving said yoke, at least one coiled spring extending between the top surface of the yoke and the top of the housing for biasing the yoke upward, and at least one guide rod extending between the base and the top of the housing, wherein the yoke is slidably mounted upon the at least one rod, said thumb lever having a first end located within the housing, and a second end external to the housing, wherein the side of the housing has a vertical lever slot extending fully therethrough, wherein the second end of the lever extends outwardly from the housing through the vertical lever slot, wherein the user selectively slides the lever vertically downward within the slot to cause the yoke to move vertically downward and thereby moves the fingers apart, and wherein when the user releases the lever, the at least one spring moves the yoke vertically upward and thereby causes the fingers to move together.

2. The holder as recited in claim 1, wherein the first end of the thumb lever terminates in a contact point which may be selectively tightened against one of the vertical rods in order to immobilize the clamping mechanism at a particular position, and wherein the second end terminates in a rotatable thumbscrew used for selectively tightening the contact point of the lever against said one of the vertical rods.

3. The holder as recited in claim 2, wherein the fingertips are each selectively attachable to a contact plate, for preventing the object which is being grasped by the holder from becoming damaged while being grasped.

4. The holder as recited in claim 3, wherein the contact plates are constructed from flexible, soft rubber.

5. The holder as recited in claim 4, wherein the housing has a substantially cylindrical body.

6. The holder as recited in claim 5, wherein the base of the housing extends outwardly from the cylindrical body of the housing, for imparting enhanced stability to the holder and for making it less likely that the holder will inadvertently tip over.

7. The holder as recited in claim 6, wherein the base has a lower surface for preventing the holder from inadvertently slipping upon a support surface upon which the holder has been situated.

8. The holder as recited in claim 7, wherein the base has a plurality of circular openings extending fully therethrough, in order that the base may be selectively anchored to the support surface by inserting a screw through each of the circular openings, and by threading said screws into the support surface.

9. The holder as recited in claim 8, wherein each of the fingers has a double convex curve including an upper curve and lower curve, wherein the upper curves orient the contact plates inward, and wherein the lower curves act as a camming surface so that the angular positions of the fingers are determined by the vertical position of the yoke, wherein the lower curve has an outermost point, and has a rod indentation for allowing one of the rods to selectively extend therein.

10. The holder as recited in claim 9, wherein the fingers taper towards their fingertips, in order to be able to more precisely engage the object which is being held between the fingertips.

11. A method of using a holder by a user for selectively immobilizing an object, said holder having a housing, at least two selectively movable fingers having fingertips, said fingers partially sheathed by the housing and partially extending from the housing, said holder having a clamping mechanism in mechanical contact with said at least two fingers for controlling the motion and position of the fingers, said mechanism having an open position, a closed position, and a plurality of partially closed positions, the clamping mechanism has a lever having a first end and a second end, the lever has a rotatable thumbscrew at its second end, the second end of the lever partially extends from said housing, and at least one spring extends between the clamping mechanism and the housing, said method comprising the steps of:

a) spreading the fingers apart;
b) positioning an object which is to be immobilized by the holder between the fingertips;
c) immobilizing the object by pushing the fingertips towards one another against the object by releasing the second end of the lever by the user and moving the fingertips together by the at least one spring;
d) immobilizing the clamping mechanism by rotating the thumbscrew;
e) freeing the clamping mechanism by counter-rotating the thumbscrew;
f) releasing the grasp of the holder upon the object by spreading the fingers apart by depressing the second end of the lever by the user; and
g) removing the object from the holder.

* * * * *